United States Patent
Case

(10) Patent No.: US 7,624,221 B1
(45) Date of Patent: Nov. 24, 2009

(54) CONTROL DEVICE FOR DATA STREAM OPTIMIZATIONS IN A LINK INTERFACE

(75) Inventor: Colyn S. Case, Hyde Park, VT (US)

(73) Assignee: NVIDIA Corporation, Santa Clara, CA (US)

( * ) Notice: Subject to any disclaimer, the term of this patent is extended or adjusted under 35 U.S.C. 154(b) by 307 days.

(21) Appl. No.: 11/460,960

(22) Filed: Jul. 28, 2006

Related U.S. Application Data

(60) Provisional application No. 60/704,773, filed on Aug. 1, 2005.

(51) Int. Cl.
 *G06F 13/40* (2006.01)
(52) U.S. Cl. .......................... 710/310; 710/18
(58) Field of Classification Search ............... 710/18, 710/310
See application file for complete search history.

(56) References Cited

U.S. PATENT DOCUMENTS

| | | | |
|---|---|---|---|
| 6,088,772 A * | 7/2000 | Harriman et al. ............ 711/158 |
| 6,272,565 B1 * | 8/2001 | Lamberts ..................... 710/43 |
| 6,721,334 B1 | 4/2004 | Ketcham | |
| 6,782,435 B2 * | 8/2004 | Garcia et al. .................. 710/33 |
| 6,792,563 B1 * | 9/2004 | DesRosier et al. ............ 714/43 |
| 7,047,374 B2 * | 5/2006 | Sah et al. .................... 711/158 |
| 7,296,109 B1 * | 11/2007 | Zhang et al. ................ 710/310 |
| 7,376,803 B1 * | 5/2008 | Eckert ........................ 711/158 |
| 2003/0163639 A1 * | 8/2003 | Baum et al. ................. 711/113 |
| 2004/0003164 A1 | 1/2004 | Boily | |
| 2004/0068603 A1 * | 4/2004 | Augsburg et al. ........... 710/310 |
| 2004/0205270 A1 | 10/2004 | Creta | |
| 2004/0233933 A1 * | 11/2004 | Munguia ..................... 370/473 |
| 2005/0044429 A1 * | 2/2005 | Gaskins et al. .............. 713/300 |
| 2006/0179329 A1 * | 8/2006 | Terechko et al. ............ 713/300 |
| 2007/0079044 A1 * | 4/2007 | Mandal et al. .............. 710/310 |
| 2007/0079090 A1 * | 4/2007 | Rajagopal et al. .......... 711/163 |
| 2008/0005795 A1 * | 1/2008 | Acharya et al. ............... 726/23 |

OTHER PUBLICATIONS

Bhatt, Ajay V. "Creating a Third Generation I/O Interconnect" Intel Developer Network for PCI Express Architecture as downloaded from the internet http://www.intel.com/technology/pciexpress/devnet/docs/WhatisPCIExpress.pdf on Aug. 29, 2005.

* cited by examiner

*Primary Examiner*—Mark Rinehart
*Assistant Examiner*—Nimesh G Patel
(74) *Attorney, Agent, or Firm*—Townsend and Townsend and Crew LLP

(57) ABSTRACT

Optimization logic that optimizes a stream of requests being transmitted onto a link by a link interface unit can be enabled or disabled based on a performance metric that represents a measure of the degree to which a response to a request is likely to be slowed due to congestion, propagation delays, or other bottlenecks in the system. For example, the performance metric can be based on a measured level of link activity due to requests from the transmitting device and/or a prediction as to behavior (e.g., access time) of the target device that receives the stream of requests. The control logic advantageously does not require extra signals to be carried on the bus.

22 Claims, 5 Drawing Sheets

CONTROL DEVICE FOR DATA STREAM OPTIMIZATIONS IN A LINK INTERFACE

CROSS-REFERENCE TO RELATED APPLICATION

This application claims the benefit of U.S. Provisional Application Ser. No. 60/704,773, filed Aug. 1, 2005, entitled "Metering Device for Data Stream Optimizations in a Bus Interface," which disclosure is incorporated herein by reference for all purposes.

The present disclosure is related to commonly-assigned co-pending U.S. patent application Ser. No. 11/179,266, filed Jul. 11, 2005, entitled "Combining Packets for a Packetized Bus," and to commonly-assigned co-pending U.S. patent application Ser. No. 11/269,975, filed Nov. 8, 2005, entitled "Memory Interface with Dynamic Selection Among Mirrored Storage Locations." The respective disclosures of these applications are incorporated herein by reference for all purposes.

BACKGROUND OF THE INVENTION

The present invention relates in general to bus interfaces, and in particular to a metering device for controlling bus interface optimizations based on a level of bus activity.

Modern personal computer systems generally include a number of different components, such as processors, memory, data storage devices using magnetic or optical media, user input devices (e.g., keyboards and mice), output devices (e.g. monitors and printers), graphics accelerators, and so on. All of these components communicate with each other via various buses implemented on a motherboard of the system. Numerous bus protocols are used, including PCI (Peripheral Component Interconnect), PCI-E (PCI Express), AGP (Advanced Graphics Processing), Hypertransport, and so on. Each bus protocol specifies the physical and electrical characteristics of the connections, as well as the format for transferring information via the bus. In many instances, the buses of a personal computer system are segmented, with different segments sometimes using different bus protocols, and the system includes bridge chips that interconnect different segments.

Buses enable system components to exchange data and control signals. For instance, when a graphics processor needs to read texture or vertex data (or other data) stored in system memory, the graphics processor requests the data via a bus and receives a response via the same bus. Where many devices are making requests for data (e.g., from system memory) or where one device is making large or frequent requests, a bus or bus segment can become saturated, leading to decreased performance. In fact, modern graphics processors are often bandwidth-limited; that is, the graphics processor's performance is limited by the ability of the bus (or buses) to deliver needed data to the graphics processor.

To improve performance, the bus interface components of graphics processors are sometimes configured to perform various optimizations on the stream of data transfer requests generated by the processor cores. Many of these optimizations involve waiting to collect a group of requests, then reordering the requests to improve efficiency in use of the bus and/or the remote memory device that services the requests. For example, one optimization involves reordering the requests such that requests accessing the same page in memory are sent consecutively, thereby reducing the average memory access latency. Another optimization involves reordering the requests to reduce the number of transitions between read and write requests; where each such transition requires a turn-around operation on the bus (or in the remote memory device), reducing the number of transitions can improve data transfer efficiency. A third example of optimization involves reordering the requests in accordance with "bank affinity" rules that reflect the structure and operational characteristics of the memory device. For instance, in some memory devices, accesses to adjoining banks (e.g., arrays in a DRAM device) can be processed faster than accesses to non-adjoining banks, and the requests can be reordered such that consecutive requests target adjoining banks to the extent practical. In other memory devices, accesses to adjoining banks are slower than accesses to non-adjoining banks, and the requests can be reordered such that consecutive requests target non-adjoining banks to the extent practical. These and other optimizations have been implemented in various graphics processors and other bus devices.

Such optimizations, however, generally increase the latency at the bus interface stage (i.e., at the point where the graphics processor drives the requests onto the bus) because reordering is only possible when more than one request is available for transmission. Optimizing circuits may therefore delay a first request for some interval during which additional requests might be received, thereby adding latency to at least some of the requests. When the bus (and/or the remote device) is heavily loaded, some requests might have to wait at the bus interface stage even without an optimizing circuit, and any latency added by the optimizing circuit is often more than offset by improvements in memory access time and/or bus performance. Thus, optimization can be a net benefit. However, when the bus is not heavily loaded, the latency introduced by the optimizing circuit is often not offset by improvements elsewhere, and optimization can actually detract from system performance. Thus, it would be ideal to perform optimizations only when the bus activity level is high enough to justify the added latency.

In some buses, this desirable behavior occurs automatically due to backpressure. For example, in buses such as PCI or AGP, the bus devices use the same physical pathways to transmit and receive requests and responses. As the rate of requests increases, the amount of activity on the bus from the remote device increases, reducing the fraction of time the bus is available for transmitting further requests. The resulting backpressure can be used to determine whether and how long to hold a request for possible reordering.

More recently, however, "bifurcated" buses with pairs of unidirectional data paths have become popular. An example is PCI Express (PCI-E), which provides physically separate paths for transmitting and receiving data. In a bifurcated bus such as PCI-E, responses sent by a remote device onto the receiving path do not immediately create backpressure on the transmission path, and so backpressure is not a reliable indicator of when optimization is likely to be advantageous.

It would therefore be desirable to determine the level of bus activity without relying on backpressure from the bus.

BRIEF SUMMARY OF THE INVENTION

Embodiments of the present invention provide link interface circuits and methods of operation in which optimization logic for optimizing a stream of requests being transmitted onto a link between two devices (e.g., a bus) can be enabled or disabled based on a performance metric that represents a measure of link performance, e.g., in terms of response time, throughput, or a combination of the two. In some embodiments, the performance metric represents the degree to which a response to a request is likely to be slowed due to congestion, propagation delays, or other bottlenecks in the system; in other embodiments, the performance metric represents link throughput (e.g., relative to link capacity); and in still other embodiments, the performance metric represents some combination of response time and throughput. For example, the performance metric can be based on a measured level of link activity due to requests from the transmitting device and/or a prediction as to the behavior (e.g., access time) of the target device that receives the stream of requests. In some embodiments, the level of activity on the link is measured using a meter circuit that can determine, e.g., the number of data transfer requests that the link interface circuit has transmitted within a recent time interval, the amount of data associated with such requests, or the number of requests that the link interface circuit has transmitted for which a response from a remote device is pending. In other embodiments, a meter circuit determines a level of activity at the remote device using predictive algorithms that are based on properties of recent requests (e.g., the particular addresses requested). Such link activity meters or remote-behavior predictors, which can be constructed from simple circuit components that consume little area, advantageously do not require any extra information to be carried on the link. In some embodiments, the link interface circuit is integrated into a processor, such as a graphics processor, that makes data requests of a remote device such as a memory device.

According to one aspect of the present invention, a link interface unit for transmitting a stream of data transfer requests from a requesting device to a target device via a link includes a request selection circuit and an optimization control circuit. The request selection circuit is configured with an active mode and a pass through mode. In the active mode, the request selection circuit applies an optimization rule to optimize at least a portion of the stream of data transfer requests and selects an optimized data transfer request for transmission onto the link, and in the pass through mode, the request selection circuit selects a data transfer request from the stream for transmission onto the link without applying the optimization rule. The request selection circuit is also coupled to receive an enable signal that selects between the active mode and the pass through mode. The optimization control circuit is coupled to the request selection circuit and is configured to compute a performance metric based on information about one or more transmitted data transfer requests. The optimization control circuit includes a decision circuit configured to assert or deassert the enable signal for the request selection circuit based at least in part on the performance metric.

For instance, the decision circuit can be configured to compare the performance metric to a threshold and to assert the enable signal in the event that the performance metric exceeds the threshold. The threshold is advantageously selected such that when the performance metric exceeds the threshold, an average latency introduced by applying the optimization rule is approximately offset by a decrease in an average response time after the data transfer request is transmitted onto the link.

In some embodiments, the performance metric corresponds to a level of link activity. The optimization control circuit can include a meter circuit configured to determine a level of link activity based at least in part on a number of data transfer requests transmitted by the link interface unit, or based at least in part on an amount of data associated with each data transfer request transmitted by the link interface unit, or based on a number of pending data transfer requests, wherein each pending data transfer request is a data transfer request that has been transmitted to a remote device by the link interface unit and for which the link interface unit has not received a response from the remote device.

In other embodiments, the performance metric corresponds to a predicted behavior of the remote device.

In still other embodiments, the performance metric corresponds to a combination of a measured level of link activity and a predicted behavior of the target device. For example, the optimization control circuit can include a predictive logic circuit configured to predict a behavior of the target device based on information about at least two of the transmitted data transfer requests. The predictive logic circuit can be further configured to predict an added latency at the target device based on target addresses of at least two of the transmitted data transfer requests; for instance, added latency at the target device might be predicted in the event that the target addresses of at least two of the transmitted data transfer requests satisfy a bank conflict condition.

Various optimizations can be enabled or disabled. For example, the request selection circuit can be configured such that applying the optimization rule includes any or all of: reordering the data transfer requests in the stream such that data transfer requests accessing a same page in a memory device are sent consecutively; reordering the data transfer requests in the stream so as to reduce a number of transitions between read operations and write operations; reordering the data transfer requests in the stream in accordance with a bank affinity preference of a memory device that services the data transfer requests; and/or combining two or more of the data transfer requests in the stream into a single request.

According to another aspect of the present invention, a method for transmitting data transfer requests onto a link is provided. Information about each data transfer request transmitted onto the link is received. Based on the received information, a performance metric is computed. A determination is made as to whether the performance metric satisfies a threshold condition. In the event that the performance metric satisfies the threshold condition, an optimization rule is applied to optimize at least a portion of a stream of outgoing data transfer requests and an optimized data transfer request is selected for transmission on the link; in the event that the performance metric does not satisfy the threshold condition, an outgoing data transfer request from the stream of outgoing data transfer requests is selected for transmission on the link without applying the optimization rule. The selected data transfer request is transmitted on the link.

The performance metric can be computed in various ways. In some embodiment, computing the performance metric includes measuring a level of link activity. A level of link activity can be measured, e.g., by measuring a number of data transfer request transmitted on the link; by measuring an amount of data associated with each data transfer request transmitted on the link; and/or by measuring a number of pending data transfer requests, wherein each pending data transfer request is a data transfer request that has been transmitted to a remote device and for which a response from the remote device has not been received.

In another embodiment, computing the performance metric can also include predicting a behavior of the target device based on the received information for at least two of the transmitted data transfer requests. For instance, an added latency at the target device can be predicted based on target addresses of at least two of the transmitted data transfer requests. In some embodiments, a measured level of link activity can be modified based on the predicted behavior, or the predicted behavior can be used as a performance metric without regard to the link activity measurement.

In some embodiments, the threshold condition is advantageously defined such that when the performance metric satisfies the threshold condition, an average latency introduced by applying the optimization rule is approximately offset by a decrease in an average response time after the data transfer request is transmitted onto the link.

According to still another aspect of the present invention, a processor includes one or more processing cores configured to generate data transfer requests and a link interface unit. The link interface unit is configured to receive data transfer requests from the one or more processing cores and to transmit the data transfer requests on a link. The link interface unit advantageously includes a request selection circuit and an optimization control circuit. The request selection circuit is configured with an active mode and a pass through mode. In the active mode, the request selection circuit applies an optimization rule to optimize at least a portion of the stream of data transfer requests and selects an optimized data transfer request for transmission on the link, and in the pass through mode, the arbitration logic circuit selects a data transfer request from the stream for transmission on the link without regard to the optimization rule. The request selection circuit is also coupled to receive an enable signal that selects between the active mode and the pass through mode. The optimization control circuit is coupled to the request selection circuit and is configured to compute a performance metric based on information about one or more transmitted data transfer requests. The optimization control circuit including a decision circuit configured to assert or deassert the enable signal for the request selection circuit based at least in part on the performance metric.

The following detailed description together with the accompanying drawings will provide a better understanding of the nature and advantages of the present invention.

DETAILED DESCRIPTION OF THE INVENTION

Embodiments of the present invention provide bus interface devices and methods of operation in which optimization logic for optimizing a stream of requests being transmitted onto the bus can be enabled or disabled based on a measured level of bus activity. The level of bus activity is measured using a meter circuit that can determine, e.g., the number of data transfer requests that the bus interface device has transmitted within a recent time interval, the amount of data associated with such requests, or the number of requests that the bus interface device has transmitted for which a response from a remote device is pending. The meter, which can be constructed from simple circuit components that consume little area, advantageously does not require extra signals to be carried on the bus or any modification of bus protocol; thus it can be used with any bus. In some embodiments, the bus interface device is integrated into a processor, such as a graphics processor, that makes bus requests.

System Overview

Figure 1:
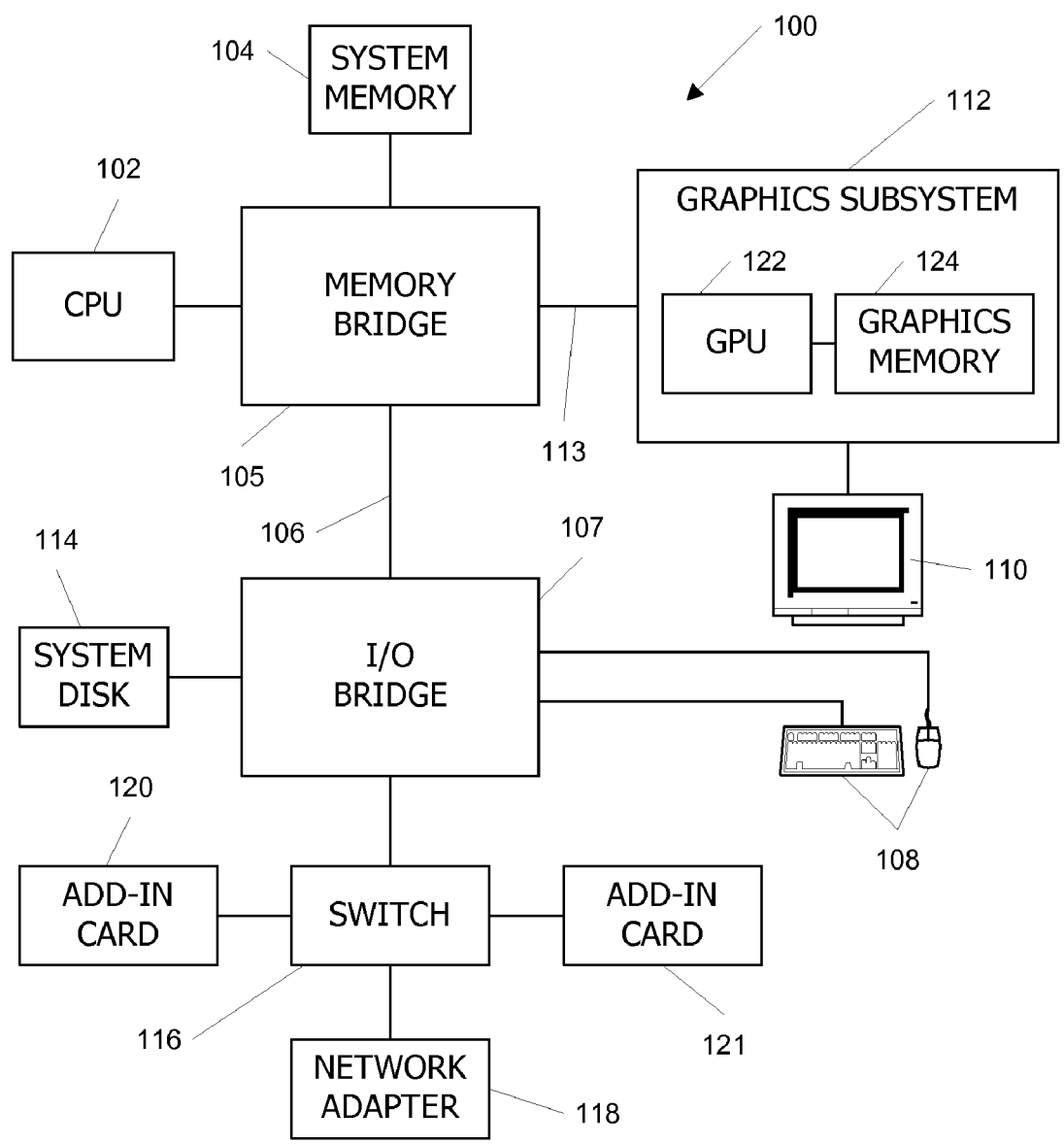
FIG. 1 is a block diagram of a computer system according to an embodiment of the present invention.

FIG. 1 is a block diagram of a computer system 100 according to an embodiment of the present invention. Computer system 100 includes a central processing unit (CPU) 102 and a system memory 104 communicating via a memory bridge 105. Memory bridge 105 is connected via a bus 106 to an I/O (input/output) bridge 107. I/O bridge 107 receives user input from one or more user input devices 108 (e.g., keyboard, mouse) and forwards the input to CPU 102 via bus 106 and memory bridge 105. Visual output is provided on a pixel-based display device 110 (e.g., a conventional CRT or LCD based monitor) operating under control of a graphics subsystem 112 coupled to memory bridge 105 via a bus 113. A system disk 114 is also connected to I/O bridge 107. A switch 116 provides connections between I/O bridge 107 and other components such as a network adapter 118 and various add-in cards 120, 121. In some embodiments, some or all of the connections among various components of system 100—e.g., between memory bridge 105 and graphics subsystem 112, between memory bridge 105 and I/O bridge 107, and between I/O bridge 107 and switch 116—are implemented using PCI-Express (PCI-E). In other embodiments, some or all of these connections may be implemented using other bus protocols such as PCI, AGP, Hypertransport, or any other bus protocol.

Graphics processing subsystem 112 includes a graphics processing unit (GPU) 122 and a dedicated graphics memory 124, which may be implemented, e.g., using one or more integrated circuit devices such as programmable processors, application specific integrated circuits (ASICs), and memory devices. GPU 122 may be configured to perform various tasks related to generating pixel data from graphics data supplied by CPU 102 and/or system memory 104 via memory bridge 105 and bus 113, interacting with graphics memory 124 to store and update pixel data, and the like. For example, GPU 122 may generate pixel data from 2-D or 3-D scene data provided by various programs executing on CPU 102. GPU 122 may also store in graphics memory 124 pixel data received via memory bridge 105 with or without further processing. GPU 122 advantageously also includes a scanout pipeline for delivering pixel data from graphics memory 124 to display device 110. Any combination of rendering and scanout operations can be implemented in GPU 122, and a detailed description is omitted as not being critical to understanding the present invention.

It will be appreciated that the system shown herein is illustrative and that variations and modifications are possible. The number and arrangement of bus devices and bridges may be modified as desired; for instance, a graphics subsystem could be connected to I/O bridge 107 rather than memory bridge 105, or I/O bridge 107 and memory bridge 105 might be integrated into a single chip. In some embodiments, a graphics processor is integrated with a bus bridge on a single chip. The topology may also be varied; in one alternative embodiment, the system memory is connected to the CPU directly rather than through a bridge.

Any number of graphics processors may be included, e.g., by connecting multiple graphics processors to bus 113 or by connecting multiple graphics processors via multiple buses 113 to memory bridge 105. Such processors may be operated in parallel to generate images for the same display device or for different display devices. Each graphics processor may have any amount of local graphics memory, including no local memory, and a graphics processor may use local memory and system memory in any combination.

Bus Interface with Optimization Control

Figure 2:
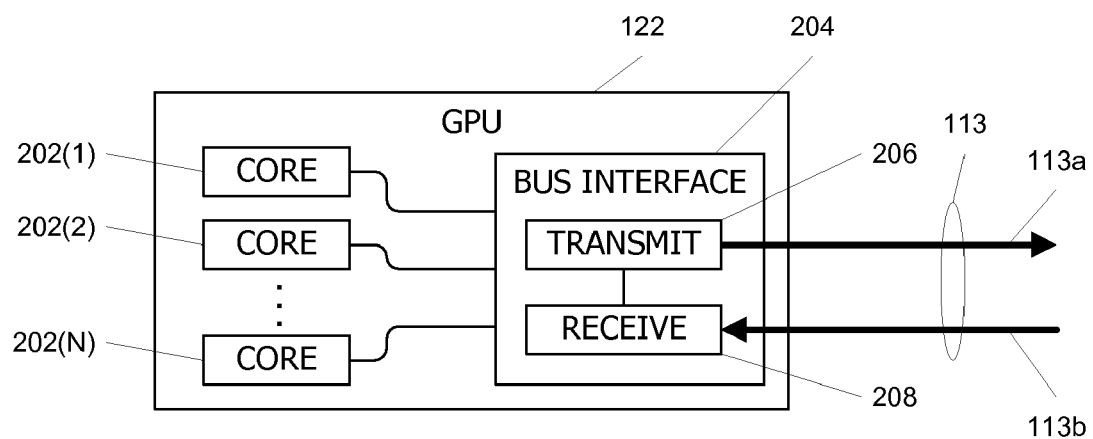
FIG. 2 is a block diagram of a graphics processor with a bus interface unit according to an embodiment of the present invention.

FIG. 2 is a block diagram of GPU 122 according to an embodiment of the present invention. GPU 122 includes multiple execution cores 202(1) to 202(N) that operate in parallel to perform rendering and/or scanout operations. In one embodiment, one of cores 202(1) to 202(N) performs scanout operations while the other cores perform rendering operations; it will be appreciated that other configurations may be used. Any number N of cores (including just one core) may be provided, and each core may be of generally conventional design.

From time to time in the course of their operations, cores 202(1) to 202(N) may require data to be retrieved from system memory 104 (FIG. 1) or other devices that are accessible to GPU 122 via bus 113. In accordance with an embodiment of the present invention, cores 202(1) to 202(N) forward such requests to a bus interface unit 204. Bus interface unit 204 includes a transmitter module 206 and a receiver module 208. Transmitter module 206, an embodiment of which is described below, forwards requests received from cores 202(1) to 202(N) to bus 113, e.g., using a dedicated outbound signal path 113*a*. As described below, transmitter module 206 includes logic circuitry configured to perform various optimizations on the requests received from cores 202(1) to 202(N) prior to sending the requests on the bus. Receiver module 208 receives responses to the requests from bus 113, e.g., on a dedicated inbound signal path 113*a*, and forwards each response to the requesting one of cores 202(1) to 202(N).

In some embodiments, the bus is a "packetized" bus, meaning that information is transferred using packets that may vary in size (e.g., a PCI-E bus). In the case of data transfer requests, each packet includes a header of fixed size (e.g., 20 bytes) that identifies the requesting device, the target device, and a target address or address range (within the target device) to or from which data is to be transferred. In some embodiments, addresses are defined in a "global" address space that is shared among multiple devices, and the target address range alone suffices to identify a target device; in such instances, a separate identifier of the target device may be omitted. Similarly, in embodiments where multiple address spaces are defined (e.g., I/O space, memory space, configuration space and so on) and portions of each space are assigned to specific target devices, the target device may be identified by specifying a target address space and a target address range within that space. The target address range, which may be of variable size, can be specified using starting and ending addresses, or a starting address and size, or the like.

The header may also include other information, such as the type of operation (e.g., read or write) that is to be performed, packet priority, a packet serial number or other unique identifier (referred to herein as a "tag") provided by the requesting device, and so on. In the case of a write operation, a request packet may also include a "payload" portion carrying the data to be written. In the case of a read operation, the payload portion of the request packet may be omitted. Numerous packet formats and protocols are known in the art, and a detailed description is omitted as not being critical to understanding the present invention. In one embodiment, the packets conform to the PCI-E protocol.

Where the packet requested a read operation, the target device advantageously returns a response packet whose payload portion includes the requested data. The header of the response packet identifies the requesting device and includes the tag from the corresponding request packet to facilitate identification of the data. In the case of a write operation, a response packet might not be sent.

In some embodiments, the target device of each read request or write request packet returns an acknowledgement ("Ack") to the device that sent the request. An Ack, which is separate from any data transfer, may be a small packet that simply indicates successful receipt of the request packet, e.g., by returning the tag associated with the request packet. In the case of a read request, the target device would return an Ack upon receipt of the request and (after an applicable read latency period) the requested data in a separate packet. The requesting device would then send an Ack back to the target device to indicate receipt of the data. In one embodiment, Acks also conform to the PCI-E protocol.

In some embodiments, transmitter module 206 provides receiver 208 the unique tag for each request sent and also provides receiver 208 information about which one of cores 202(1)-202(N) originated the request. Receiver 208 matches request tags in the headers of incoming response packets to the request tags provided by transmitter module 206 and uses that information to direct the response to the originating one of cores 202(1)-202(N).

In some instances, other devices in system 100 (FIG. 1) may request a data transfer to or from graphics processing subsystem 112, e.g., to or from graphics memory 124. In this situation, receiver 208 receives an incoming request via bus 113 and forwards the request to an appropriate handler within graphics processing subsystem 112. The handler may be, e.g., one of cores 202(1) to 202(N) or a separate graphics memory interface module (not shown in FIG. 2). The response (if any) is returned from the handler to transmitter module 206, which sends the response to the requesting device via bus 113.

Use of bus 113 and bus interface unit 204 is not limited to data transfer requests and responses. In some embodiments, the bus may also be used to communicate control information (e.g., interrupts, resets, and the like) between system components, in addition to data transfer requests and responses.

In one embodiment, bus 113 is a PCI-E bus, with separate outbound and inbound paths 113*a*, 113*b* for sending packets and receiving packets, respectively, as shown in FIG. 2. It will be appreciated that other buses could be substituted, with or without separate outbound and inbound paths, and the present invention is not limited to PCI-E. Those skilled in the art will recognize that the present invention may be practiced with any type of data transfer link that may connect two devices, including conventional buses, direct device-to-device connections between chips, and on-chip interconnects among processing elements within a single integrated circuit.

Figure 3:
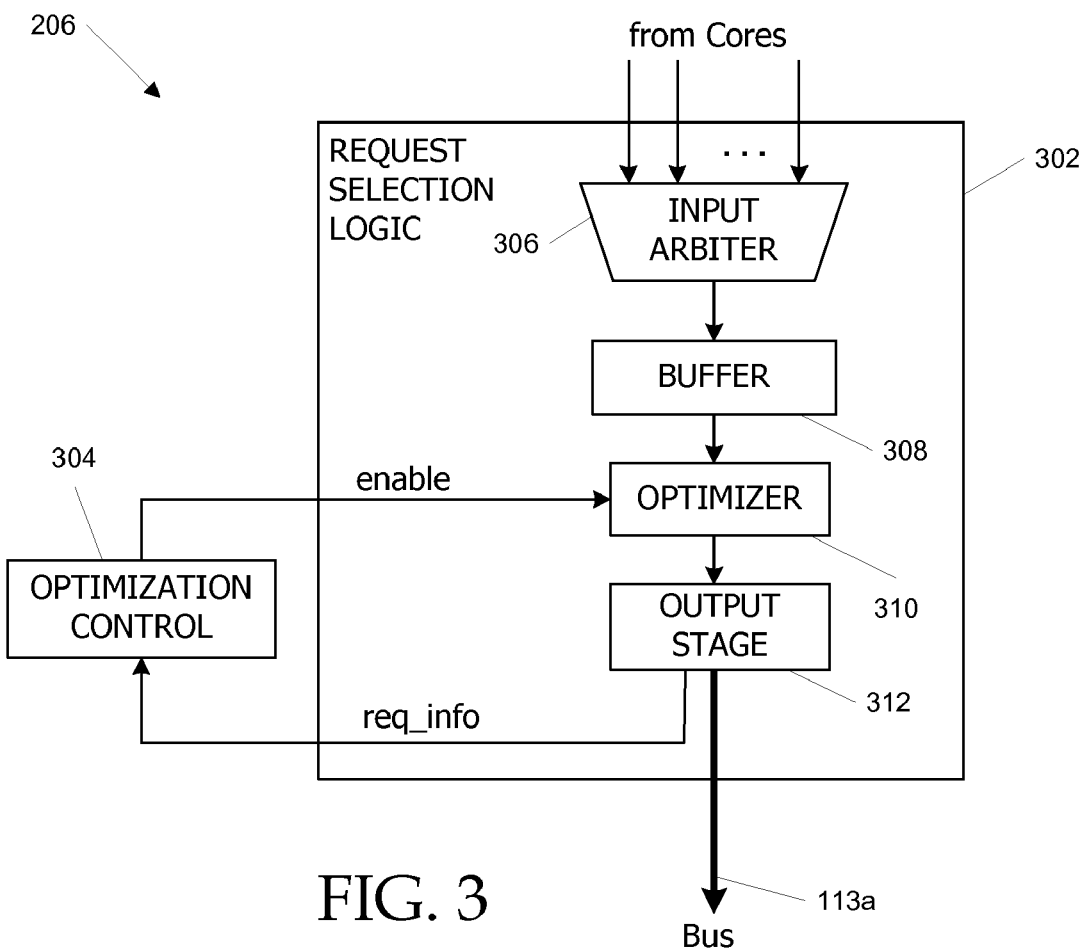
FIG. 3 is a block diagram of a transmitter module for a bus interface unit according to an embodiment of the present invention.

FIG. 3 is a block diagram of transmitter module 206 according to an embodiment of the present invention. Transmitter module 206 includes request selection logic 302 and an optimization control circuit 304. Request selection logic 302 receives requests from cores 202(1) to 202(N) and selects a request to be forwarded to outgoing bus path 113*a*. More specifically, request selection logic 302 includes an input arbiter circuit 306, a buffer 308, an optimizer circuit 310, and an output stage 312.

Input arbiter circuit 306 receives requests from cores 202(1) to 202(N) and queues the requests in buffer 308, forming a request stream. Since multiple cores may make requests at the same time, input arbiter circuit 306 advantageously includes control logic for arbitrating among simultaneous requests. Conventional arbitration or scheduling rules such as round-robin, priority-based arbitration, or the like may be used, and a particular arbitration scheme is not critical to the present invention. In one embodiment, input arbiter 306 forwards up to one request per clock cycle to buffer 308.

Optimizer circuit 310 examines the request stream in buffer 308, determines which request (or requests) to send next based on various optimization algorithms, and delivers an optimized request (which may incorporate one or more requests from the stream in buffer 308) to output stage 312. Any type of optimization may be implemented. The optimization may involve, for example, reordering requests to improve memory access times and/or combining multiple requests into a single larger request to reduce overhead on the bus. Reordering can be done in various ways, examples of which are known in the art as described above. In other embodiments, the optimization may include combining multiple requests into a single packet for transmission on the bus, e.g., as described in above-referenced Application Ser. No. 11/179,266. Multiple sparse requests can also be combined into a larger request (e.g., a read/modify/write request), and a request for a block of data may be expanded, e.g., based on patterns of target addresses, to include a larger block of data than the requested amount in expectation that additional data in the larger block will be requested by one of cores 202. In still other embodiments, the optimization may involve selecting among multiple alternative target devices to fulfill a particular request. It will be appreciated that particular optimizations are not critical to the present invention, and any number and combination of optimization algorithms may be used. Many, though not necessarily all, optimization algorithms require at least some requests to wait in buffer 308 for a predefined or variable latency period before determining whether an optimization is possible in a given instance. Thus, in many cases, optimization can be expected to increase transmitter latency.

In accordance with an embodiment of the present invention, optimizer circuit 310 can be enabled or disabled by an enable signal that is asserted or deasserted by optimization control circuit 304 as described below. When the enable signal is not asserted, optimizer circuit 310 switches to a "pass-through" operating mode in which requests leave buffer 308 in the order established by input arbiter 306, with relatively little added latency or other overhead. When the enable signal is asserted, optimizer circuit 310 switches to an "active" operating mode in which it performs optimization algorithms to reorder and/or combine requests. The pass-through mode of optimizer 310 can result in a lower average latency for transmitter module 206 because requests are not held in buffer 308 to wait for later requests; pass-through mode is advantageously used when the level of bus activity is low. The active mode, which may increase the average latency of transmitter module 206, is advantageously used when the level of bus activity is high enough that the benefits of optimizing are expected to outweigh any increase in transmitter latency resulting from execution of the optimization algorithm.

Output stage 312 receives the control signal from optimizer circuit 310 and reads out the selected request from buffer 308 to outbound path 113a. Output stage 312, which may be of generally conventional design, may include formatting circuits for converting the request to a format complying with the bus protocol, driver circuits for driving the signals onto the lines of outbound path 113a, and so on.

In accordance with an embodiment of the present invention, optimization control circuit 304 gathers information related to activity on outbound path 113a and/or activity at the remote device and, based on this information, asserts or deasserts an enable signal to control operation of optimizer circuit 310. The information gathered by optimization control circuit 304 advantageously includes request information (req_info) from output stage 312. This request information can include any information about the request including, e.g., request size information (such as the amount of data being requested or provided), target address range information, and so on.

In operation, optimization control circuit 304 uses the received request information to compute a "performance metric." As used herein, a "performance metric" can be any quantity that represents a measure of the degree to which a response to a request is likely to be slowed due to congestion, propagation delays, or other bottlenecks at various points in the system. Various factors can be used to define a performance metric.

For example, in some embodiments, the performance metric is based (wholly or in part) on a measurement of the level of activity on bus 113 resulting from requests made by bus interface unit 204. In some embodiments, optimization control circuit 304 determines a level of activity on bus 113 based on request size information. In the case of a read request, the request size information advantageously indicates the amount of data requested (e.g., in number of bytes); in the case of a write request, the request size information advantageously indicates the amount of data to be written. From the request size information received during some time interval, optimization control circuit 304 determines the level of activity on the bus. Measuring a level of bus activity is referred to herein as "metering," and examples of meter circuits are described below.

In other embodiments, the performance metric is based (wholly or in part) on a prediction of activity at the target device. For example, as is known in the art, throughput (and therefore access time) for some memory devices depends in part on the sequence of addresses received; certain sequences may provide higher or lower throughput than others. In some embodiments, based on the sequence of target addresses in the transmitted requests, optimization control circuit 304 can predict when throughput will be slowed (e.g., due to bank conflicts). Optimization control circuit 304 can use this prediction as a performance metric, or combine this prediction with a bus activity level measured by a metering circuit to generate the performance metric.

Optimization control circuit 304 applies a threshold condition to the performance metric and asserts the enable signal if the threshold condition is satisfied. Optimizer circuit 310 is thus put in the active mode so that the optimization is applied to subsequent requests. If the threshold condition is not satisfied, the enable signal is deasserted, and optimizer circuit 310 switches to the pass-through mode. In embodiments described herein, the performance metric is defined such that larger values correlate with longer response times, and the threshold condition is satisfied if the performance metric exceeds the threshold; however, those skilled in the art will appreciate that other metrics could be defined, including metrics inversely correlated with the response time.

Optimization Control Circuit with Metering

Figure 4:
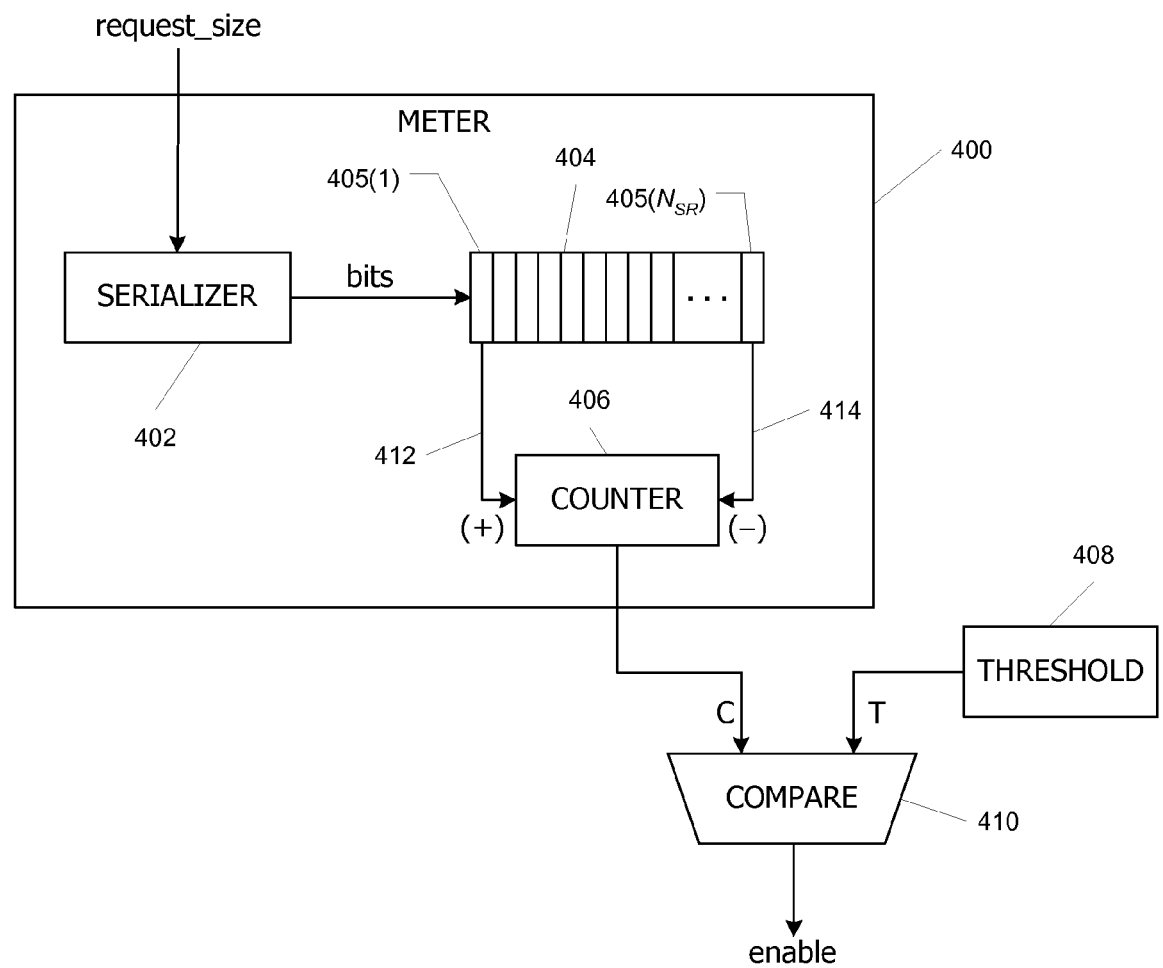
FIG. 4 is a block diagram of a meter circuit for a bus interface unit according to an embodiment of the present invention.

In some embodiments of the present invention, optimization control circuit 304 is implemented as a meter circuit that measures a level of bus activity and determines whether to enable an optimization based on that measurement. FIG. 4 is a block diagram of a meter circuit 400 implementing optimization control circuit 304 according to an embodiment of the present invention. A similar meter circuit, applied in a different context, is described in above-referenced application Ser. No. 11/269,975. Meter circuit 400 includes a serializer 402, a shift register 404, a counter 406, a threshold register 408, and a comparison circuit 410.

Serializer 402 receives the request size information for each data transfer request transmitted on bus 113 and generates a bit corresponding to each cycle of a data clock (not explicitly shown). The data clock advantageously corresponds to a bus clock, and the bit value generated by serializer 402 for each cycle reflects whether transmitter module 206 requested (or transmitted) data during that cycle. In one embodiment, a "1" (or logic high) bit is generated corresponding to each clock cycle when data is transmitted (or is expected to be transmitted in response to a read request) and a "0" (or logic low) bit is generated corresponding to each cycle when data is not transmitted (or is not expected to be transmitted in response to a read request). Where the amount of data associated with a request is variable, serializer 402 advantageously generates one or more "1" bits, depending on the size of the request. For example, in one embodiment, 16 bytes of data can be transmitted per data clock. Transmitting data in response to a request for 64 bytes requires four clocks, and serializer 402 would generate the bit sequence "1111" upon receiving a signal indicating a requested size of 64 bytes. The bit generated by serializer 402 on each clock cycle is loaded into shift register 404.

Shift register 404, which may be of generally conventional design, includes a series of latches (or nodes) 405(1) to 405($N_{SR}$) coupled such that data bits are loaded into latch 405(1) and shift from one latch to the next on each clock cycle. Any number $N_{SR}$ of latches may be included, and shifting of data from one latch 405 to the next is advantageously synchronized with the data clock.

Counter 406 is configured to provide a running count (C) of the number of logic high bits in shift register 404 and is advantageously capable of counting up to at least $N_{SR}$ without saturating or wrapping. Counter 406 is incremented in response to a signal on line 412 that is asserted each time a logic high bit is loaded into latch 405(1) of shift register 406 and decremented in response to a signal on line 414 that is asserted each time a logic high bit reaches latch 405($N_{SR}$). Thus, the count value C provided by counter 406 reflects the number of data clock cycles, during the most recent $N_{SR}$ cycles, that produced data on the bus.

As noted above, shift register 404 may include any number $N_{SR}$ of latches. In one embodiment, $N_{SR}$=100, and the count value C directly represents the percentage of time that the bus is being used to transmit data. In another embodiment, $N_{SR}$ is selected such that C=100 (or some other preselected value of C) represents approximately the maximum utilization of the bus to transmit data; since it is generally not possible for a bus to move data during every clock cycle, $N_{SR}$ would be somewhat larger than 100. For instance, as is known in the art, some buses support data transfer operations on up to about 80% of clock cycles, with the remaining clock cycles being used for other purposes. If $N_{SR}$ is chosen to be 125, then C=100 would correspond to a saturation condition (i.e., data being carried 80% of the time). In some embodiments, shift register 404 may be implemented with a large number of latches 405 and control logic allowing the readout point (line 414) to be selectably coupled to different ones of latches 405; thus, the parameter $N_{SR}$ can be configurable.

Comparison circuit 410 compares the count value C provided by counter 406 to a threshold value T stored in a threshold register 408. Threshold value T represents a level of bus activity above which it becomes desirable for optimizer circuit 310 to reorder and/or combine requests or perform other optimizations. This threshold value is advantageously less than $N_{SR}$ and also advantageously somewhat less than the value of C that corresponds to the maximum utilization. For instance, in the embodiment described above, where $N_{SR}$=125 and the bus can be used for data transfer up to 80% of the time, a value of T=90 (90% of maximum utilization) might be selected. In some embodiments, the threshold value T is a configurable system parameter whose value can be adjusted according to the available bandwidth of the bus in a particular implementation.

If the count C exceeds the threshold T, comparison circuit 410 asserts the enable signal, causing optimizer 310 to operate in active mode. Otherwise, comparison circuit 410 deasserts the enable signal, causing optimizer 310 to operate in pass-through mode.

It will be appreciated that the meter circuit described herein is illustrative and that variations and modifications are possible. Other counters and/or meter mechanisms capable of measuring the amount of data that is being delivered to and/or requested from a remote device may be substituted for the shift-register-driven counter described herein. In some embodiments where requests are sent to multiple remote devices, the meter circuit only counts requests sent to a particular remote device; in other embodiments, the meter circuit counts requests sent to different remote devices separately; and in still other embodiments, the meter circuit maintains a single count based on all requests to all remote devices. The meter circuit might also count read and write requests separately, or it might count only read requests or only write requests.

In other embodiments, the amount of data associated with each request is a constant, and the meter circuit can reliably measure the bus activity by simply counting the number of requests that are transmitted.

In some embodiments, graphics processor 122 (FIG. 1) might not be the only device making requests of a particular remote device such as system memory 104, and meter circuit 400, which monitors requests initiated by graphics processor 122 but not requests initiated by other devices, might underestimate the input/output (I/O) load on the remote device. In instances where the I/O load on the remote device, rather than bus bandwidth, is a limiting factor, meter circuit 400 might not reliably enable the optimization logic at an appropriate point. One alternative embodiment of a meter circuit estimates the total load on a remote device based on the delay in responses from that device. Thus, an alternative meter circuit estimates the total load on a remote device.

Figure 5:
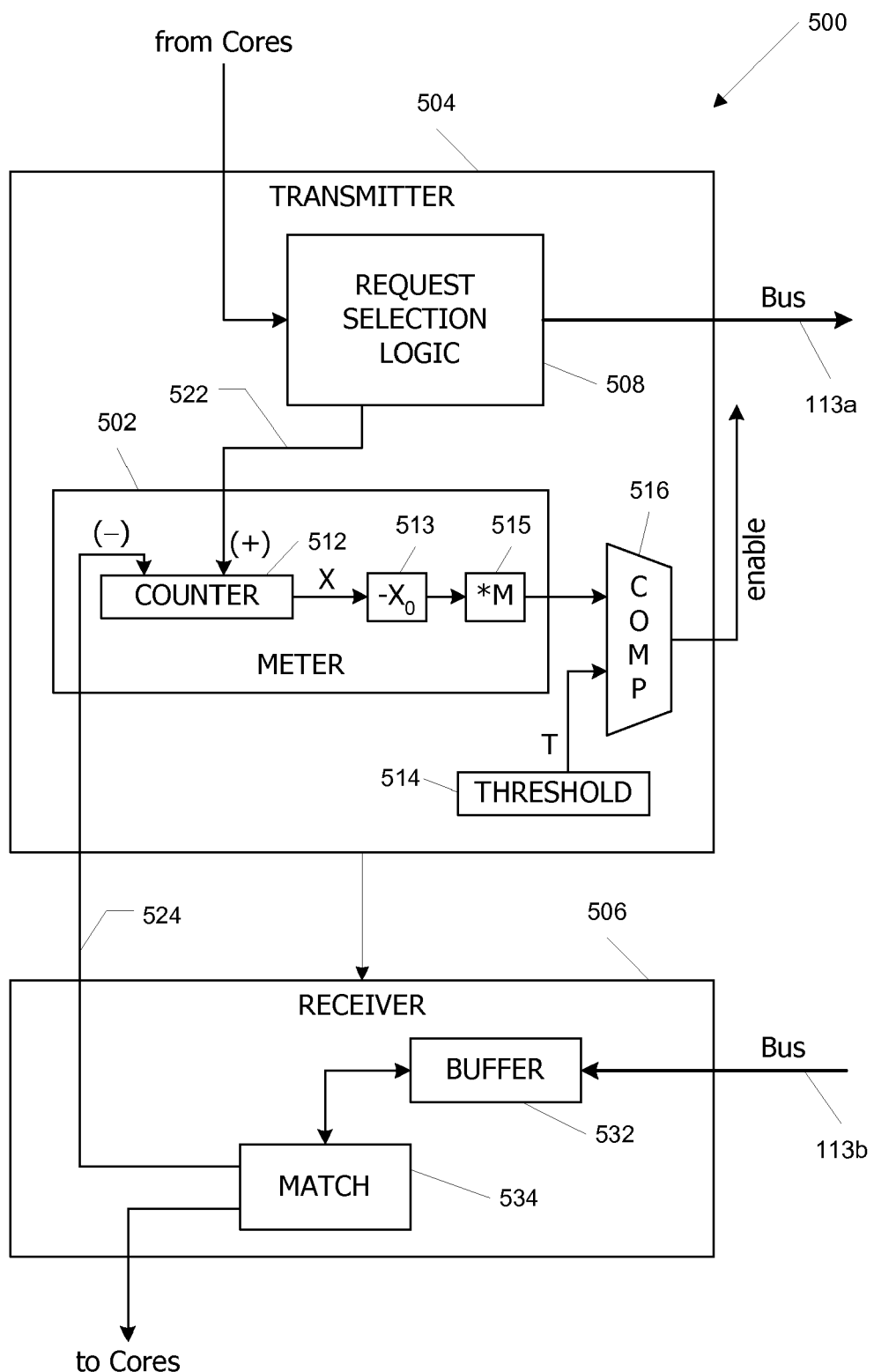
FIG. 5 is a block diagram of a bus interface unit that includes a meter circuit according to another embodiment of the present invention.

For example, FIG. 5 is a block diagram of a bus interface unit 500 that includes a meter circuit 502 implementing optimization control circuit 304 of FIG. 3 according to another embodiment of the present invention. Meter circuit 502 estimates the level of I/O activity at the remote device based on the number of "pending" requests, i.e., requests that have been transmitted by bus interface unit 500 but for which a response has not yet been received from the targeted device. Meter circuit 502 is shown as part of a transmitter module 504 (which may be an implementation of transmitter module 206 of FIG. 2) that transmits requests onto outbound bus path 113a. Transmitter module 504 includes request selection logic 508, which may be generally similar to request selection logic 302 of FIG. 3 described above. Like request selection logic 302, request selection logic 508 includes an optimizer circuit (not explicitly shown in FIG. 5) that can be enabled or disabled in response to an enable signal generated by meter circuit 502.

A receiver module 506 (which may be an implementation of receiver module 208 of FIG. 2) is coupled to inbound bus path 113b and receives responses to requests sent by transmitter module 504. Receiver module 506 includes a pending request buffer 532 and a match logic unit 534. In operation, each time transmitter module 504 sends a request on outbound path 113a, information about the request is provided to receiver module 506 for use in matching responses to requests. Such information may be generally conventional in nature and may include, e.g., a unique serial number or other tag identifying the request and an identifier of the one of cores 202(1) to 202(N) that initiated the request. Receiver module 506 stores this information in pending request buffer 532. When a response to a request is received on inbound path 113$b$, match logic unit 534 matches identifying information in the response (e.g., the serial number or tag) to an entry in buffer 532 and directs the response to the appropriate one of cores 202(1) to 202(N). It should be noted that within the context of the present invention, match logic unit 534 can be used to measure latency for a specific group of requests; for purposes of determining the number of outstanding requests, match logic unit 534 is not required.

Meter circuit 502 includes a counter 512. Counter 512 is incremented in response to a signal on line 522 that is asserted each time a request is sent by request selection logic 508 of transmitter module 504. Counter 512 is decremented in response to a signal on line 524 that is asserted each time a response is matched to a pending request by match logic unit 534. Thus, provided that the remote device can be expected to respond eventually to every request, the count value X produced by counter 512 represents the number of pending requests from bus interface unit 500.

In some embodiments, meter circuit 502 also includes a subtraction circuit 513 that subtracts a baseline value $X_0$ from the value X generated by counter 512 and a scaling circuit 515 that rescales the value $(X-X_0)$ by a scaling factor m to determine a final activity measurement $C_0$. Subtraction circuit 513 and scaling circuit 515 are used to adjust the count value X for comparison to the threshold value T.

More specifically, in this embodiment, it is assumed that the number of pending data transfer requests is related to the level of I/O activity in the remote device, at least in cases where the level of activity in the remote device is near saturation. The relationship in the near-saturation region is expressed using a linear approximation as:

$$Y=m*(X-X_0), \quad (1)$$

where Y represents the level of activity in the remote device (defined in such a way that Y=0 when $X=X_0$) and m, and $X_0$ are adjustable parameters whose values depend on the particular implementation. At some activity level Y=T that is near the saturation level, it becomes desirable to perform optimizations. Subtraction circuit 513 and scaling circuit 515 produce an activity measurement $C_0$ that corresponds to Y in Eq. (1), allowing a direct comparison to the threshold activity level T. Accordingly, subtraction circuit 513, which may be implemented using conventional circuit techniques, advantageously clamps its result to zero (meaning that a value of zero is generated whenever $X<X_0$). Thus, when bus activity is low, $C_0$ measures bus activity only to the extent of indicating that the activity level is sufficiently low that saturation is not a concern. It should be noted that parameters m and $X_0$ are implementation-dependent and can be determined, e.g., by empirical measurements of a particular bus configuration. In one embodiment where the maximum number of outstanding requests is 32, $X_0=7$ and m=4; other values may also be used.

Scaling circuit 515 may be implemented in various ways. For instance, in some embodiments where values are represented as binary digits, the scaling factor m is advantageously selected to be a power of 2, and scaling circuit 515 can be implemented as a left-shift and/or right-shift circuit; the shift amount and direction can be configurable. In other embodiments, scaling circuit 515 may be a multiplier for scaling by an arbitrary scaling factor m, which may be a configurable system parameter.

In still other embodiments, subtraction circuit 513 and scaling circuit 515 may be omitted, in which case the activity measurement $C_0$ is just the number of pending requests X Comparison circuit 516 compares the activity measurement $C_0$ (or the number of pending requests X) to a threshold value (T) stored in register 514 and asserts or deasserts the enable signal based on the comparison. If $C_0$ exceeds T, then the activity level in the remote device is relatively high, and the enable signal is asserted. If $C_0$ is less than T, then the activity level in the remote device is sufficiently low that the enable signal is deasserted.

It will be appreciated that meter circuit 500 is also illustrative and that variations and modifications are possible. The particular equations and parameter values used to select a threshold may be modified as desired. Persons of ordinary skill in the art will recognize that a linear relationship between the number of pending requests X and the activity level Y of the remote device is not required for the present invention, and other embodiments may implement nonlinear relationships. In addition, threshold value T can be directly configured based on experience in a particular system implementation. In some embodiments, the threshold value T is defined such that subtracting and scaling are not required. For instance, Eq. (1) can be solved for X:

$$X=(Y/m)+X_0, \quad (2)$$

from which one can define an alternative threshold T' as:

$$T'=(T/m)+X_0. \quad (3)$$

Threshold T' can be compared directly to X without scaling or subtraction.

In addition, other counters and/or logic circuits capable of measuring pending requests to a remote device may be substituted for the counter described herein. In some embodiments where the bus interface unit sends requests to multiple remote devices, the meter circuit only counts pending request for a particular remote device; in other such embodiments, the meter circuit counts pending requests for different remote devices separately; and in still other embodiments, the meter circuit maintains a single count based on all pending requests for all remote devices. In addition, the size of the pending requests, rather than the number of such requests, may be used to measure the level of activity.

Optimization Control with Predictive Logic

In still other embodiments, optimization control circuit 304 predicts a response time of the remote device and uses this information in determining whether to enable or disable an optimization. This information can be combined with bus activity level information from a meter circuit to provide a more complex performance metric.

Figure 6:
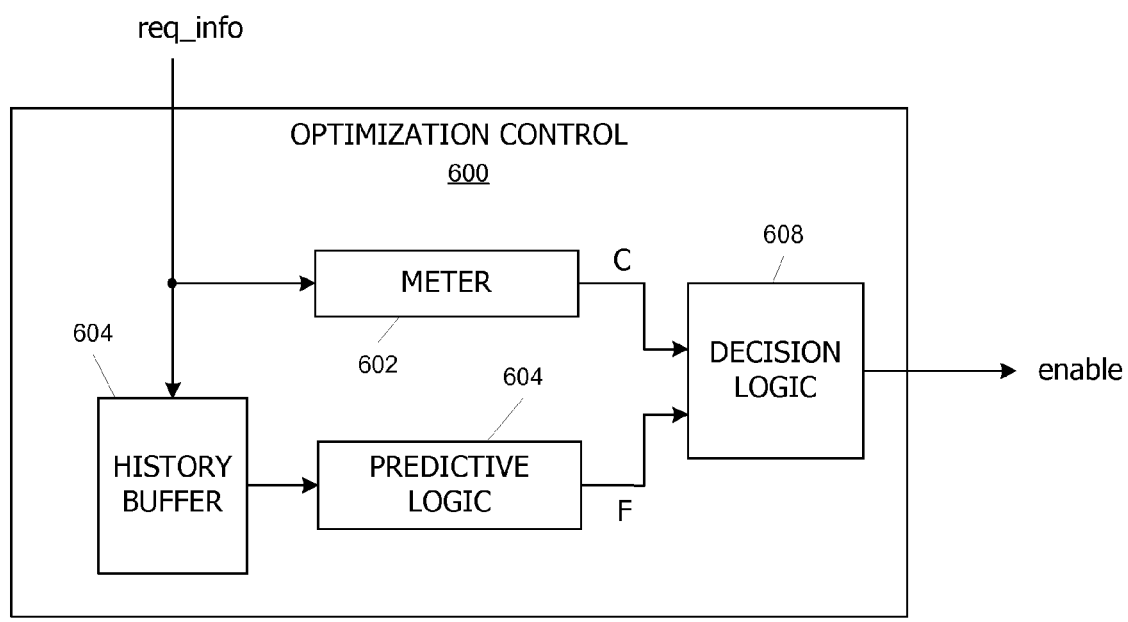
FIG. 6 is a block diagram of an optimization control circuit that includes a meter circuit and predictive logic according to an embodiment of the present invention.

FIG. 6 is a block diagram of an optimization control circuit 600 according to an embodiment of the present invention. Optimization control circuit 600 includes both a meter circuit 602 and a predictive logic circuit 604. Request information req_info, provided by output stage 312 of request selection logic 302 of FIG. 3, is provided to meter circuit 602 and to a history buffer 606. It is to be understood that the request information provided to history buffer 606 can be the same as or different from request information provided to meter circuit 602. For instance, in one embodiment, request size information is provided to meter circuit 602 while target address information is provided to history buffer 606.

Meter circuit 602 may be implemented similarly to meter circuits 400 (FIG. 4) and/or 502 (FIG. 5) described above. Meter circuit 602 produces a bus activity measurement (e.g., count C of meter 400 or activity measurement $C_0$ of meter 502) that is delivered to a decision logic circuit 608.

History buffer 606 is advantageously implemented as a circular queue or similar circuit that stores request information received in connection with the most recent N requests, for an arbitrary number N. The optimum choice of N involves tradeoffs between increased predictive accuracy that can result from a longer record and the size of buffer 606. In an alternative embodiment, history buffer 606 may also store statistical information, such as an average request size or representative access pattern. Such statistical information can be determined from the most recent N requests using suitably configured computation logic and can be stored in addition to or instead of per-request information.

History buffer 606 provides the stored information, including per-request information and/or statistical information derived therefrom, to predictive logic block 604. Predictive logic block 604 advantageously implements a predictive logic algorithm that computes a predicted response factor F. In some embodiments, predicted response factor F corresponds to a predicted response time (or adjustment in response time) or a load factor for the target device.

For example, in one embodiment, the optimizer 304 that is being controlled by circuit 600 applies memory access reordering optimizations to maximize time between bank conflicts. (As is known in the art, a bank conflict can reduce throughput of a memory device.) For this embodiment, the history information maintained in buffer 606 might include the size, direction (read or write), and target address of each request, as well as the interarrival time between successive requests. Using the target address information, predictive logic circuit 604 can identify the bank associated with each request. Based on the pattern of times at which each bank is accessed, predictive logic circuit 604 can then predict whether a bank conflict will occur. If predictive logic circuit 604 has information as to the effect of a bank conflict on response time of the target device (e.g., if the target device uses an optimized memory controller), predictive logic circuit 604 can determine a number of cycles to be added to a predicted response time as the result of any detected bank conflict. The response factor F in one embodiment corresponds to the number of cycles to be added.

In some embodiments, predictive logic circuit 604 is used to control an optimization that maximizes throughput of the remote device (e.g., memory) servicing the data transfer requests. When predictive logic circuit 604 detects that the remote device is near saturation, the throughput optimization can be applied. In such cases, applying the throughput optimization might or might not improve the response time of the remote device, but it is expected to optimize the amount of data transferred per unit time.

Decision logic circuit 608 receives the bus activity measurement C from meter circuit 602 and the response factor F from predictive logic circuit 604. Based on these two inputs, decision logic circuit 608 determines whether to enable or disable an optimization. It will be appreciated that in a specific embodiment, the decision process depends on the particular meaning of the C and F signals.

For example, in an embodiment where response factor F represents cycles to be added due to a bank conflict, decision logic circuit 608 could add response factor F to activity measurement C and compare the sum to a threshold. If the sum is above the threshold, then the optimization is enabled. In this embodiment, if bank conflicts are relatively frequent, the optimization would become enabled at a lower level of bus activity than would be the case if bank conflicts were less frequent.

It is to be understood that other decision processes could also be implemented in decision logic 608. For instance, activity measurement C could be compared to a first threshold while response factor F is compared to a second threshold, with the optimization being enabled if either threshold is exceeded.

In some embodiments, any of the components of optimization control circuit 600 can be configured (e.g., during system startup) depending on various parameters of the system in which the bus interface unit is to operate. For instance, if the limiting factor on data throughput is the speed of the bus (link), meter circuit 602 alone may provide sufficient information, and decision logic 608 might be configurable to use only bus activity measurement C in determining whether to enable or disable the optimization. If the link speed approaches or exceeds the response speed of the target device, decision logic 608 advantageously uses the response factor F in addition to bus activity measurement C.

It will be appreciated that the optimization control circuits described herein are illustrative and that variations and modifications are possible. A decision whether to enable an optimization can be based on any performance metric, and such metrics may include any combination of link activity measurements and/or predicted target device behavior.

In some embodiments, the frequency with which optimizer 310 of FIG. 3 can be switched between enabled and disabled states is limited, e.g., by preventing decision logic circuit 608 of FIG. 6 from changing the state of the enable signal for some time period after a first state change. For instance, where the optimization relates to selecting among multiple remote devices to service a particular request, the efficiency might be highest when a group of related requests is delivered to the same device, as opposed to splitting the group between two (or more) devices. Rapidly switching between alternative devices can reduce the size of related groups and thus reduce efficiency.

Further Embodiments

While the invention has been described with respect to specific embodiments, one skilled in the art will recognize that numerous modifications are possible. For instance, the invention is not limited to use with particular optimization operations; an optimization control mechanism of the type described herein can be used to enable or disable any optimizations. In some embodiments where the optimizer logic includes multiple optimizations, the optimization control circuit can be configured to select which optimizations to perform based on bus activity level, and different optimizations might be enabled or disabled at different levels of bus activity.

Metering mechanisms in accordance with embodiments of the present invention may be used to enable or disable optimizations for any bus including system buses as described above or local buses, such the local bus on a graphics card that connects the graphics processor to a local memory device. Metering may be applied to any bus protocol, including protocols where the data transfer paths are bidirectional.

Further, the present invention is not limited to use in a graphics processor. The metering mechanisms and bus interface units described herein may be adapted for use in any processor or other bus device for which optimization of a stream of data transfer requests is desirable under at least some system conditions.

In addition, the foregoing description makes reference to a "bus" as a pathway that links two or more devices in a computer system, supporting data transfers between the devices. It is to be understood that the use of the term "bus" herein is not intended to limit the invention to any specific protocols; any communication link between two devices may be substituted.

Thus, although the invention has been described with respect to specific embodiments, it will be appreciated that the invention is intended to cover all modifications and equivalents within the scope of the following claims.

What is claimed is:

1. A link interface unit for transmitting a stream of data transfer requests from a requesting device to a target device via a link, the link interface unit comprising:
    a request selection circuit configured with an active mode and a pass-through mode, wherein:
        in the active mode the request selection circuit applies an optimization rule to optimize at least a portion of the stream of data transfer requests and selects an optimized data transfer request for transmission onto the link; and
        in the pass-through mode the request selection circuit selects a data transfer request from the stream for transmission onto the link without applying the optimization rule;
    the request selection circuit being coupled to receive an enable signal that selects between the active mode and the pass-through mode; and
    an optimization control circuit coupled to the request selection circuit and configured to compute a performance metric based on information about one or more transmitted data transfer requests, the performance metric corresponding to a predicted behavior of the target device, the optimization control circuit including a decision circuit configured to assert or deassert the enable signal for the request selection circuit based at least in part on the performance metric.

2. The link interface unit of claim 1 wherein the decision circuit is configured to compare the performance metric to a threshold and to assert the enable signal in the event that the performance metric exceeds the threshold.

3. The link interface unit of claim 2 wherein the threshold is selected such that when the performance metric exceeds the threshold, an average latency introduced by applying the optimization rule is approximately offset by a decrease in an average response time after the data transfer request is transmitted onto the link.

4. The link interface unit of claim 2 wherein the performance metric corresponds to a level of link activity.

5. The link interface unit of claim 4 wherein the optimization control circuit includes a meter circuit configured to determine a level of link activity based at least in part on a number of data transfer requests transmitted by the link interface unit.

6. The link interface unit of claim 4 wherein the optimization control circuit includes a meter circuit configured to determine a level of link activity based on a number of pending data transfer requests, wherein each pending data transfer request is a data transfer request that has been transmitted to the target device by the link interface unit and for which the link interface unit has not received a response from the target device.

7. The link interface unit of claim 2 wherein the optimization control circuit includes a meter circuit configured to determine a level of link activity based at least in part on an amount of data associated with each data transfer request transmitted by the link interface unit.

8. The link interface unit of claim 1 wherein the performance metric corresponds to a combination of a measured level of link activity and the predicted behavior of the target device.

9. The link interface unit of claim 1 wherein the optimization control circuit includes a predictive logic circuit configured to predict the behavior of the target device based on information about at least two of the transmitted data transfer requests.

10. The link interface unit of claim 9 wherein the predictive logic circuit is further configured to predict an added latency at the target device based on target addresses of at least two of the transmitted data transfer requests.

11. The link interface unit of claim 10 wherein the predictive logic circuit is further configured such that the added latency at the target device is predicted in the event that the target addresses of at least two of the transmitted data transfer requests satisfy a bank conflict condition.

12. The link interface unit of claim 1 wherein the request selection circuit is further configured such that applying the optimization rule includes reordering the data transfer requests in the stream such that data transfer requests accessing a same page in a memory device are sent consecutively.

13. The link interface unit of claim 1 wherein the request selection circuit is further configured such that applying the optimization rule includes reordering the data transfer requests in the stream so as to reduce a number of transitions between read operations and write operations.

14. The link interface unit of claim 1 wherein the request selection circuit is further configured such that applying the optimization rule includes reordering the data transfer requests in the stream in accordance with a bank affinity preference of a memory device that services the data transfer requests.

15. The link interface unit of claim 1 wherein the request selection circuit is further configured such that applying the optimization rule includes combining two or more of the data transfer requests in the stream into a single request.

16. A method for transmitting data transfer requests onto a link, the method comprising:
    receiving information about each data transfer request transmitted onto the link; computing a performance metric based on the received information, wherein the act of computing the performance metric includes measuring a level of link activity, wherein the act of measuring the level of link activity includes measuring a number of pending data transfer requests, and wherein each pending data transfer request is a data transfer request that has been transmitted to a target device and for which a response from the target device has not been received;
    determining whether the performance metric satisfies a threshold condition; in the event that the performance metric satisfies the threshold condition, applying an optimization rule to optimize at least a portion of a stream of outgoing data transfer requests and selecting an optimized data transfer request for transmission on the link; in the event that the performance metric does not satisfy the threshold condition, selecting an outgoing data transfer request from the stream of outgoing data transfer requests for transmission on the link without applying the optimization rule; and
    transmitting the selected data transfer request on the link.

17. The method of claim 16 wherein the act of measuring the level of link activity includes measuring a number of data transfer request transmitted on the link.

18. The method of claim 16 wherein the act of measuring the level of link activity includes measuring an amount of data associated with each data transfer request transmitted on the link.

19. The method of claim 16 wherein the act of computing the performance metric further includes:
   predicting a behavior of the target device based on the received information for at least two of the transmitted data transfer requests; and
   modifying the measured level of link activity based on the predicted behavior.

20. The method of claim 19 wherein the act of predicting the behavior of the target device includes:
   predicting an added latency at the target device based on target addresses of at least two of the transmitted data transfer requests.

21. The method of claim 16 wherein the threshold condition is defined such that when the performance metric satisfies the threshold condition, an average latency introduced by applying the optimization rule is approximately offset by a decrease in an average response time after the data transfer request is transmitted onto the link.

22. A processor comprising:
   one or more processing cores configured to generate data transfer requests; and
   a link interface unit configured to receive a stream of data transfer requests from the one or more processing cores and to transmit the data transfer requests on a link, the link interface unit including:
   a request selection circuit configured with an active mode and a pass-through mode, wherein in the active mode the request selection circuit applies an optimization rule to optimize at least a portion of the stream of data transfer requests and selects an optimized data transfer request for transmission on the link and wherein in the pass-through mode the request selection circuit selects a data transfer request from the stream for transmission on the link without applying the optimization rule;
   the request selection circuit being coupled to receive an enable signal that selects between the active mode and the pass-through mode; and
   an optimization control circuit coupled to the request selection circuit and configured to compute a performance metric based on information about one or more transmitted data transfer requests, the performance metric corresponding to a predicted behavior of a target device, the optimization control circuit including a decision circuit configured to assert or deassert the enable signal for the request selection circuit based at least in part on the performance metric.

* * * * *